United States Patent [19]

Langford

[11] 4,132,415
[45] Jan. 2, 1979

[54] WIPER APPARATUS FOR CABLE RODS

[75] Inventor: William D. Langford, Stow, Ohio

[73] Assignee: Incom International Inc., Pittsburgh, Pa.

[21] Appl. No.: 795,533

[22] Filed: May 10, 1977

[51] Int. Cl.² .......................... F16C 1/26; F16J 15/56
[52] U.S. Cl. ........................................ 277/12; 277/24;
277/183; 277/184; 277/209; 74/503; 308/3.5; 308/36.5
[58] Field of Search ................ 74/501 R, 502, 503, 74/501 P; 277/DIG. 4, 24, 12, 112, 182-184, 209, 210; 308/3.5, 36.1, 36.5; 16/2, 108

[56] References Cited

U.S. PATENT DOCUMENTS

| 1,191,137 | 7/1916 | Powers | 277/184 X |
| 1,644,311 | 10/1927 | Davis et al. | 16/108 X |
| 1,793,882 | 2/1931 | Yanchenko | 16/108 X |
| 2,608,422 | 8/1952 | Allinquant | 277/24 |
| 2,732,861 | 1/1956 | Gilmore | 74/501 R X |
| 3,221,572 | 12/1965 | Swick | 74/501 R |
| 3,462,175 | 8/1969 | Johnson | 277/209 X |
| 3,479,100 | 11/1969 | Pitner | 277/183 X |
| 3,804,203 | 4/1974 | Koschmieder et al. | 308/36.5 X |

FOREIGN PATENT DOCUMENTS

| 661598 | 11/1951 | United Kingdom | 74/502 |
| 905487 | 9/1962 | United Kingdom | 74/501 |

Primary Examiner—Robert S. Ward, Jr.
Attorney, Agent, or Firm—James C. Wray

[57] ABSTRACT

A wiper which clamps on cable conduit and fits over end cup seals has an opening which loosely receives a sliding cable rod to scrape debris from the rod before portions of the rod enter the seal. The wiper is formed from a strip of spring steel pierced centrally to receive the rod. The piercing forms a slight convex shape and leaves a bow which extends toward the end of the rod to further aid the debris-removing function. The strip is bent rearwardly and then inwardly on both sides, and termini of the strip are formed with abutting semi-circular recesses to engage the conduit behind the end cup.

12 Claims, 6 Drawing Figures

WIPER APPARATUS FOR CABLE RODS

BACKGROUND OF THE INVENTION

This invention relates generally to cable rod wiping devices and more particularly has reference to a cable rod wiping device which clamps on the cable conduit and fits over the cup seal connected to the conduit.

DESCRIPTION OF THE PRIOR ART

Pertinent United States and foreign patents are found in Class 74, subclasses 469, 490, 491, 501R, 501T, 502, 503 and 504, and Class 277, subclass 24 of the official classification of patents in the United States Patent and Trademark Office.

Examples of pertinent patents are U.S. Pat. Nos. 989,641; 2,544,537; 2,895,156; 2,982,590; 3,224,817; 3,345,076; 3,477,730; 3,515,444; 3,549,154; 3,655,204; 3,835,933; 3,866,923 and 3,871,665.

U.S. Pat. No. 989,641 shows semi-circular abutting openings in the retaining portion of the scraper. The scraper has an axial hinge and a more complex structure than the present invention.

U.S. Pat. Nos. 2,895,156, 3,477,730, and 2,544,537 disclose scraping devices in which the scraping elements are planar.

The mounting means of the scraper in U.S. Pat. No. 3,982,590 is of general interest.

U.S. Pat. No. 3,515,444 shows a metallic scraper, whereas most of the remaining patents cited, such as U.S. Pat. Nos. 3,549,154 and 3,655,204, show plastic scrapers held within recesses at the outer end of the rod housings.

Many problems remain in the prior art devices. The prior art wipers have relatively complex structures and are difficult to attach to the cable conduit. Removal of defective wipers is equally as difficult. In addition, those prior art devices wherein the wiping member is positioned within the sealing member cause undue interference with the movement of the cable rod and the sealing function of the sealing member.

SUMMARY OF THE INVENTION

The present invention overcomes many of the problems which exist in the prior art devices. The present invention provides an inexpensive wiping device which clamps onto cable conduits and fits over the end cup seal connected to the conduit. An opening is provided in the wiper which loosely received the sliding rod to scrape ice, snow, mud and other debris from the rod before portions of the rod enter the seal. In a preferred embodiment, a strip of spring steel is pierced centrally to receive the rod. The piercing may form a slight convex shape and may leave a bow which extends toward the end of the rod to further aid the ice chipping function. The strip is bent rearwardly and then inwardly on both sides, and termini of the strip are formed with abutting semi-circular recesses to engage the conduit behind the end cup.

OBJECTS OF THE INVENTION

Objects of the invention are, therefore, to provide an improved cable rod wiping device, to provide a cable rod wiping device which is inexpensive and simply constructed, to provide a cable rod wiping device which is easily attached to the cable conduit and easily removable as well, to provide a cable rod wiping device which permits the cable rod to slide freely therethrough, and to provide a cable rod wiping device used in combination with a cable rod sealing device wherein the two devices perform independently.

Another object is to provide a wiper apparatus adapted to be mounted on a cable conduit having a cable rod slidably positioned therein, the conduit connected to a seal disposed for sealing engagement with the rod, comprising a forward wall positioned exteriorly forward of the seal and having an opening configured for loose contact with the cable rod received therein, and means connected to the forward wall for supportingly limiting axial displacement of the forward wall.

Still another object is to provide a wiper apparatus adapted to be mounted on a cable conduit having a cable rod slidably positioned therein, the conduit connected to a seal disposed for sealing engagement with the rod, comprising a forward wall positioned exteriorly forward of the seal and having an opening configured to receive the cable rod, an annular lip connected to the forward wall which extends forwardly at an angle beyond the forward wall and is configured for loose contact with the cable rod received therein, and means connected to the forward wall for supportingly limiting axial displacement of the forward wall.

A further object is to provide a wiper apparatus adapted to be mounted on a cable conduit having a cable rod slidably positioned therein comprising, a seal member connected to the conduit and having axial bore disposed for sealing engagement with the rod, the seal member embracing the end portion of the conduit and terminating rearwardly in a radially extending shoulder, a forward wall positioned exteriorly forward of the seal and having an opening configured for loose contact with the cable rod received therein, a rearward wall positioned exteriorly rearward of the seal and having an opening configured to receive the cable conduit, and an axial portion positioned exteriorly of the seal and connected to the forward wall and rearward wall, the shoulder having sufficient radial length to prevent displacement of the rearwall forwardly of the shoulder.

These and other and further objects and features of the invention are apparent in the disclosure which includes the above and below specifications and claims and drawings.

DETAILED DESCRIPTION OF THE DRAWINGS

Figure 1:
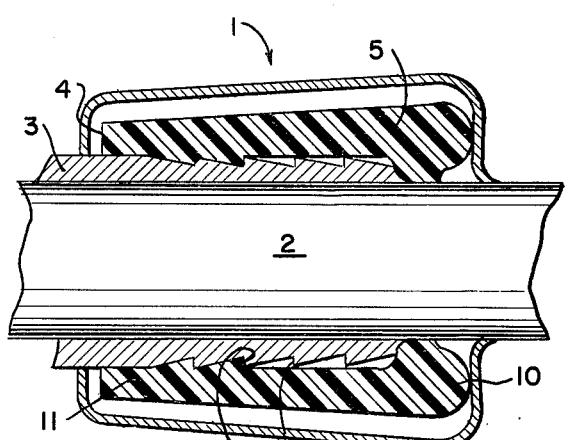
FIG. 1 is a side elevational view, partially in section, of the wiper of the present invention shown mounted on a cable conduit having a cable rod sealably slidable therein.
Figure 2:
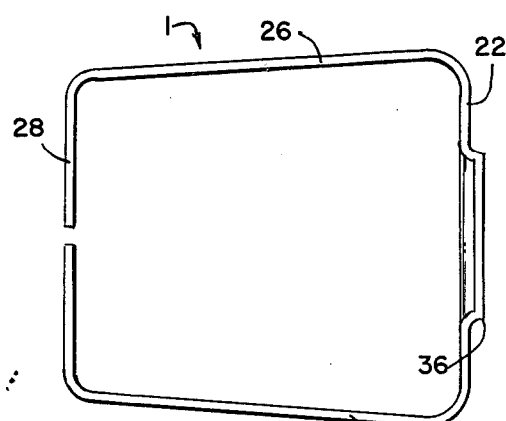
FIG. 2 is a side elevational view of the wiper of the present invention.
Figure 5:
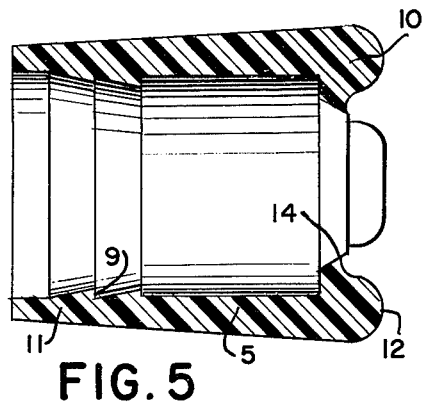
FIG. 5 is a side elevational view, partially in section, of the cup seal of the present invention.
Figure 6:
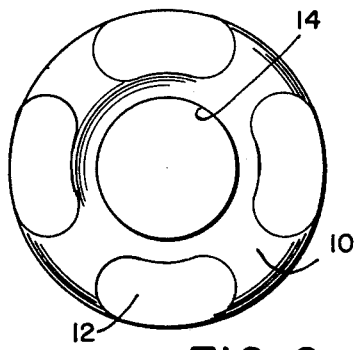
FIG. 6 is an elevational view of the forward axial end of the cup seal shown in FIG. 5.
Figure 4:
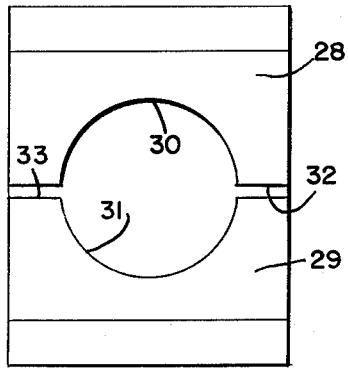
FIG. 4 is an elevational view of the opposite axial end face of the wiper of the present invention.
Figure 3:
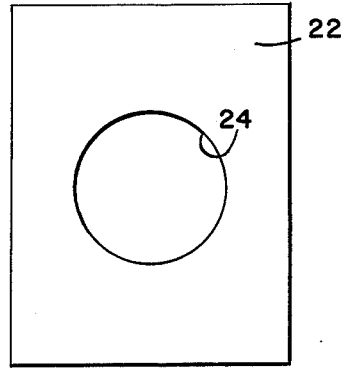
FIG. 3 is an elevational view of one axial end face of the wiper of the present invention.

Referring to FIG. 1, the wiper 1 of the present invention is shown connected to a cable conduit 3, having a cable rod 2 slidably positioned therein. A cup seal 5 embraces the end portion of the conduit 3 and has an axial bore 14 disposed for sealing engagement with the rod 2. Serrations 9 on the inner surface of the side wall 11 of the seal 5 are adapted to cooperate with corresponding serrations 8 on the conduit 3 to secure the seal 5 to the conduit 3.

The wiper 1 has a forward wall 22 having an opening 24 configured to loosely receive the rod 2. Side walls 26 and 27 are connected to opposite side of the forward wall 22. Rear walls 28 and 29 are connected to the rearward ends of the side walls 26 and 27. Abutting ends 32 and 33 of the rear walls 28 and 29 are provided with semi-circular recesses 30 and 31 configured to engage the conduit 3 behind the cup seal 5.

Preferably, the wiper 1 is formed integrally from a single strip of spring steel material. With such a construction, the wiper 1 is mounted on the conduit 3 by simply separating the rear walls 28 and 29 along the butting ends 32 and 33 and sliding the rear walls 28 and 29 over the cup seal 5. The opening 24 in the forward wall 22 of the wiper 1 is aligned with the cable rod 2 to enable the rod 2 to project through the opening 24. When the rear walls 28 and 29 are positioned behind the seal 5 they are urged toward the conduit 3. The shoulder 4 at the rearward end of the seal 5 prevents the rear walls 28 and 29 from moving forwardly past the seal 5. It is understood, that an annular flange 21 connected to the conduit 3 forwardly of the rear walls 28 and 29 could perform a function similar to the restraining function performed by the shoulder 4 on the seal 5.

An annular lip 36 is provided on the forward wall 22 of the wiper 1 adjacent the opening 24 by piercing the forward wall 22 to form the opening 24. The resulting jagged edge is left on the lip 36 to facilitate the chipping function of the wiper 1.

The seal 5 is provided with spaced projections 12 which abut the rearward surface of the forward wall 22. The projections 12 hold the forward wall 22 away from the sealing bore 14 of the cup seal 5.

In one embodiment, the side walls 26 and 27 of the wiper 1 have an axial length slightly less than the axial length of the seal 5. The projections 12 on the seal 5 urge the forward wall 22 of the wiper 1 into a slight convex shape. As a result, debris removed from the rod 2 by the wiper 1 is prevented from accumulating on the surface of the forward wall 22 surrounding the opening 24. In another embodiment, the same result is achieved by preforming the forward wall 22 of the wiper 1' in a slight convex shape. Piercing of the forward wall 22 in a manner previously described produces the desired convex shape.

In operation, the lip 36 on the forward wall 22 of the wiper 1 wipes snow, mud and other debris from the rod 2 as the rod moves past the forward wall 22 prior to entering the seal 5. The jagged edge on the lip 36 serves to chip ice which is frozen to the rod 2. In an alternative embodiment, the lip 36 is eliminated and the surface of the forward wall 22 immediately adjacent the opening 24 performs the wiping and chipping functions.

Since the lip 36 is configured to loosely contact the rod 2, free sliding movement of the rod 2 past the forward wall is unimpaired. Similarly, the recesses 30 and 31 in the rear walls 28 and 29 are configured to loosely contact the conduit 3. This enables the wiper 1 to automatically adjust its position on the conduit 3 to the most effective wiping position. Furthermore, loose mounting of the wiper 1 on the conduit 3 prevents the wiper 1 from exerting side loads on the rod 2 and distorting the sealing opening 14 on the cup seal 5.

While the invention has been described with reference to a specific embodiment, the exact nature and scope of the invention is defined in the following claims.

What is claimed is:

1. Wiper apparatus adapted to be mounted on a cable conduit having a cable rod slidably positioned therein, the conduit connected to a seal disposed for sealing engagement with the rod, comprising
   a forward wall adapted to be positioned exteriorly forward of the seal and having an opening configured for loose contact with the cable rod received therein, and
   means connected to the forward wall for supportingly limiting axial displacement of the forward wall, wherein said means comprise an axial portion connected to the forward wall, a first rearward wall connected to the axial portion and having a first recess configured to engage the conduit, a second rearward wall connected to the axial portion and having a second recess configured to engage the conduit, the first and second recesses adapted to be disposed to enclose a sufficient circumferential portion of the conduit to limit radial displacement of the rearward walls, and means adapted to be connected to the conduit for limiting axial displacement of the rearward walls.

2. The apparatus of claim 1 wherein the forward wall, the first and second rearward walls and the axial portion are formed integrally of a spring steel material.

3. Wiper apparatus adapted to be mounted on a cable conduit having a cable rod slidably positioned therein, the conduit connected to a seal disposed for sealing engagement with the rod, comprising
   a forward wall adapted to be positioned exteriorly forward of the seal and having an opening configured for loose contact with the cable rod received therein, and
   means connected to the forward wall for supportingly limiting axial displacement of the forward wall, wherein said means comprise a first rearward wall having a first recess configured to engage the conduit, a second rearward wall having a second recess configured to engage the conduit, the first and second recesses adpated to be disposed to enclose a sufficient circumferential portion of the conduit to limit radial displacement of the rearward walls, side walls connected to the forward wall and the first and second rearward walls, and means adapted to be connected to the conduit for limiting axial displacement of the rearward walls.

4. The appratus of claim 3 wherein the forward wall, the first and second rearward walls and the side walls are formed integrally of a spring steel material.

5. The apparatus of claim 3 wherein the first and second rearward walls are disposed in a co-planar relationship.

6. The apparatus of claim 3 wherein the first and second recesses are formed in semicircular shapes and are disposed in abutting relationship.

7. The apparatus of claim 3 wherein the side walls are adapted to be positioned exteriorly of the seal and the rearward walls are adapted to be positioned exteriorly rearward of the seal.

8. Wiper apparatus adapted to be mounted on a cable conduit having a cable rod slidably positioned therein, the conduit connected to a seal disposed for sealing engagement with the rod, comprising a forward wall adapted to be positioned exteriorly forward of the seal and having an opening configured for loose contact with the cable rod received therein, and means connected to the forward wall for supportingly limiting axial displacement of the forward wall, further comprising a seal adapted to be connected to the cable conduit and disposed for sealing engagement with the rod, projections connected to the seal and extending forwardly, the rearward surface of the forward wall disposed in bearing relationship with the forward surface of the projections.

9. Wiper apparatus adapted to be mounted on a cable conduit having a cable rod slidably positioned therein, the conduit connected to a seal disposed for sealing engagement with the rod, comprising a forward wall positioned exteriorly forward of the seal and having an opening configured to receive the cable rod, an annular lip connected to the forward wall which extends forwardly at an angle beyond the forward wall and is configured for loose contact with the cable rod received therein, and means connected to the forward wall for supportingly limiting axial displacement of the forward wall, wherein said means comprise a first rearward wall having a first recess configured to engage the conduit, a second rearward wall having a second recess configured to engage the conduit, the first and second recesses disposed to enclose a sufficient circumferential portion of the conduit to limit radial displacement of the rearward walls, side walls connected to the forward wall and first and second rearward walls, and means connected to the conduit for limiting axial displacement of the rearward walls.

10. Wiper apparatus mounted on a cable conduit having a cable rod slidably positioned therein comprising, a seal member connected to the conduit and having an axial bore disposed for sealing engagement with the rod, the seal member embracing the end portion of the conduit and terminating rearwardly in a radially extending shoulder, a forward wall positioned exteriorly forward of the seal and having an opening configured for loose contact with the cable rod received therein, a rearward wall positioned exteriorly rearward of the seal and having an opening configured to receive the cable conduit, and an axial portion positioned exteriorly of the seal and connected to the forward wall and rearward wall, the shoulder having sufficient radial length to prevent displacement of the rearward wall forwardly of the shoulder.

11. Wiper apparatus mounted on a cable conduit having a cable rod slidably positioned therein comprising, a seal member connected to the conduit and having an axial bore disposed for sealing engagement with the rod, the seal member embracing the end portion of the conduit and terminating rearwardly in a radially extending shoulder, a forward wall positioned exteriorly forward of the seal and having an opening configured for loose contact with the cable rod received therein, a first rearward wall positioned exteriorly rearward of the seal and having a first recess configured to engage the conduit, a second rearward wall positioned exteriorly rearward of the seal and having a second recess configured to engage the conduit, the first and second recesses adapted to be disposed to enclose a sufficient circumferential portion of the conduit to limit radial displacement of the rearward walls, and sidewalls connected to the forward wall and the first and second rearward walls, the shoulder having sufficient radial length to prevent displacement of the rearward walls forwardly of the shoulder.

12. The apparatus of claim 11 wherein the forward wall, the first and second rearward walls, and the side walls are formed integrally of a spring steel material.

* * * * *